(12) United States Patent
Mohn

(10) Patent No.: US 7,355,781 B2
(45) Date of Patent: Apr. 8, 2008

(54) SPATIAL LIGHT MODULATOR WITH PERFORATED HINGE

(75) Inventor: Jonathan David Mohn, Saratoga, CA (US)

(73) Assignee: Gehode Corporation, Saratoga, CA (US)

( * ) Notice: Subject to any disclaimer, the term of this patent is extended or adjusted under 35 U.S.C. 154(b) by 0 days.

(21) Appl. No.: 11/489,403

(22) Filed: Jul. 19, 2006

(65) Prior Publication Data

US 2007/0019278 A1 Jan. 25, 2007

Related U.S. Application Data

(60) Provisional application No. 60/702,139, filed on Jul. 25, 2005.

(51) Int. Cl.
G02B 26/00 (2006.01)
G02B 26/08 (2006.01)
G09G 3/34 (2006.01)
G03B 21/28 (2006.01)

(52) U.S. Cl. ............ 359/291; 359/290; 359/295; 359/298; 359/214; 359/224; 359/245; 345/84; 353/30; 353/99; 216/24

(58) Field of Classification Search ........ 359/290–293, 359/295, 298, 214, 224, 245; 353/30, 98, 353/99; 345/84, 87; 310/36, 309; 216/24; 73/504.02, 504.03
See application file for complete search history.

(56) References Cited

U.S. PATENT DOCUMENTS

| | | | |
|---|---|---|---|
| 4,280,756 A | 7/1981 | Albertinetti | |
| 4,317,611 A | 3/1982 | Petersen | |
| 4,421,381 A * | 12/1983 | Ueda et al. | 359/214 |
| 4,592,628 A | 6/1986 | Altman | |
| 4,918,032 A | 4/1990 | Jain | |
| 5,083,857 A | 1/1992 | Hornbeck | |
| 5,751,469 A * | 5/1998 | Arney et al. | 359/291 |
| 5,808,781 A * | 9/1998 | Arney et al. | 359/291 |
| 5,953,153 A * | 9/1999 | Conner et al. | 359/298 |
| 6,201,631 B1 * | 3/2001 | Greywall | 359/245 |
| 6,351,329 B1 * | 2/2002 | Greywall | 359/290 |
| 6,633,212 B1 * | 10/2003 | Ruan et al. | 335/78 |
| 6,769,616 B2 * | 8/2004 | Fu et al. | 235/454 |
| 6,819,470 B2 | 11/2004 | Meier | |
| 6,825,968 B2 | 11/2004 | Aubuchon | |
| 6,856,446 B2 | 2/2005 | DiCarlo | |
| 6,867,897 B2 | 3/2005 | Patel | |
| 6,985,279 B1 * | 1/2006 | Fu | 359/291 |
| 7,034,370 B2 * | 4/2006 | Kuo | 257/414 |
| 7,042,619 B1 | 5/2006 | McGinley | |
| 7,187,485 B2 * | 3/2007 | Bernstein et al. | 359/290 |
| 7,212,328 B2 * | 5/2007 | Jilani et al. | 359/291 |
| 2004/0145795 A1 | 7/2004 | Pan | |
| 2005/0128564 A1 | 6/2005 | Pan | |

\* cited by examiner

Primary Examiner—Loha Ben
(74) Attorney, Agent, or Firm—Robert Scotti

(57) ABSTRACT

A spatial light modulator (SLM) is disclosed that increases speed and efficiency of an SLM through the use of a perforated hinge. The hinge may take many forms, but generally includes an elongated body having holes therein along its longitudinal direction. One or more electrodes are charged with a predetermined voltage in order rotate a reflecting surface towards the electrodes through electrostatic attraction. The perforations within the hinge results in the hinge being made from less material so that it is less sensitive to hinge thickness variations that can occur during the manufacturing process. Consequently, the perforated hinge allows for more stable, uniform mirror rotation.

29 Claims, 16 Drawing Sheets

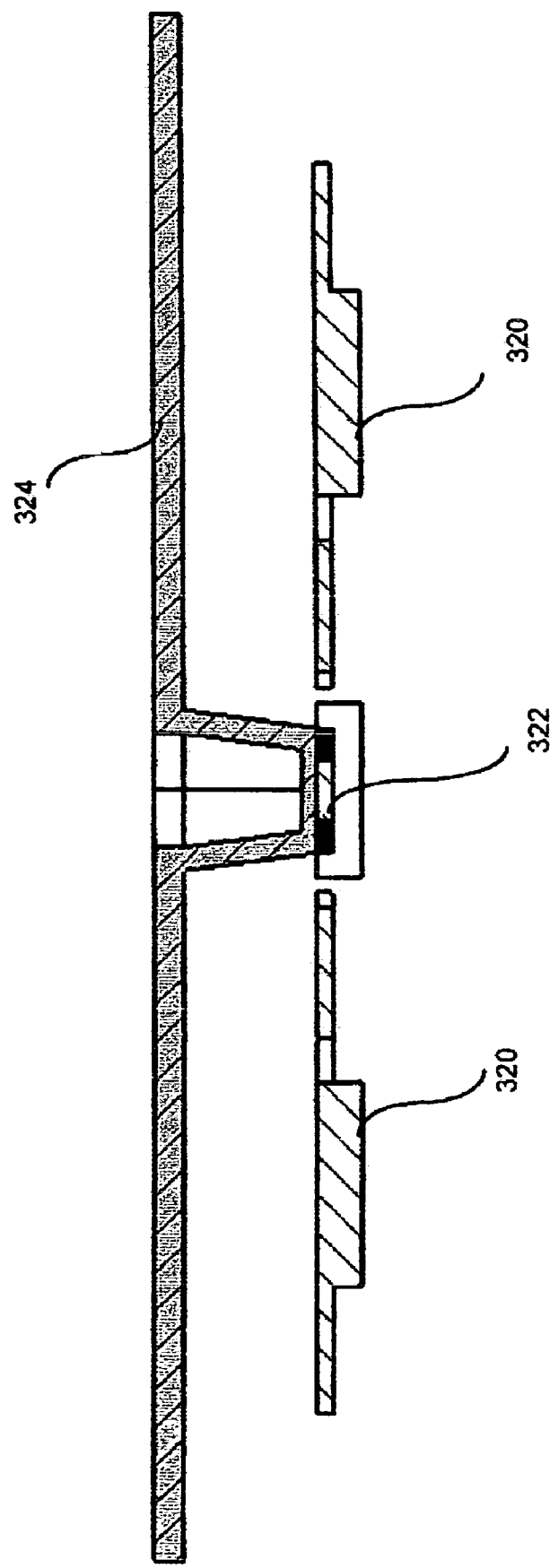

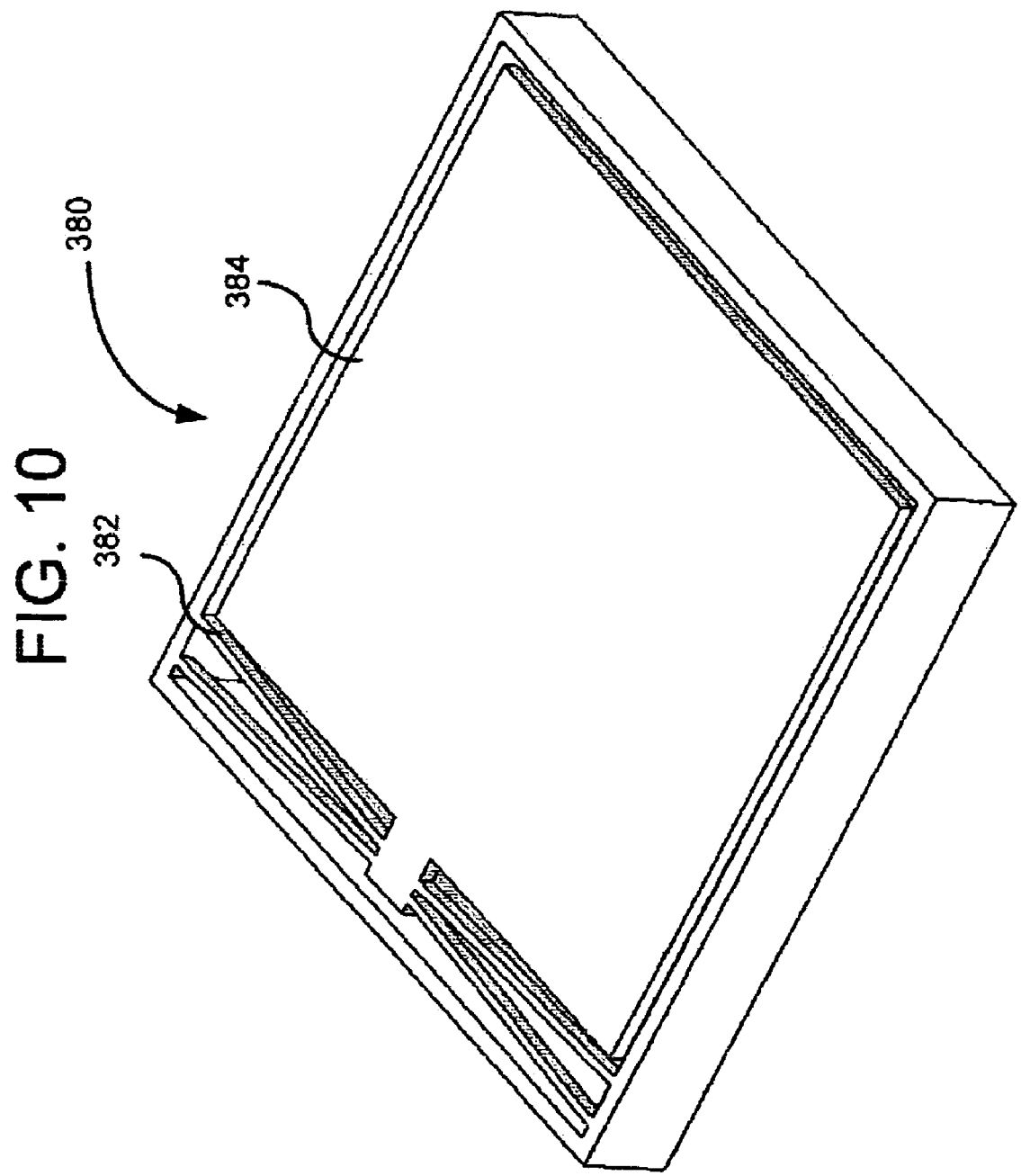

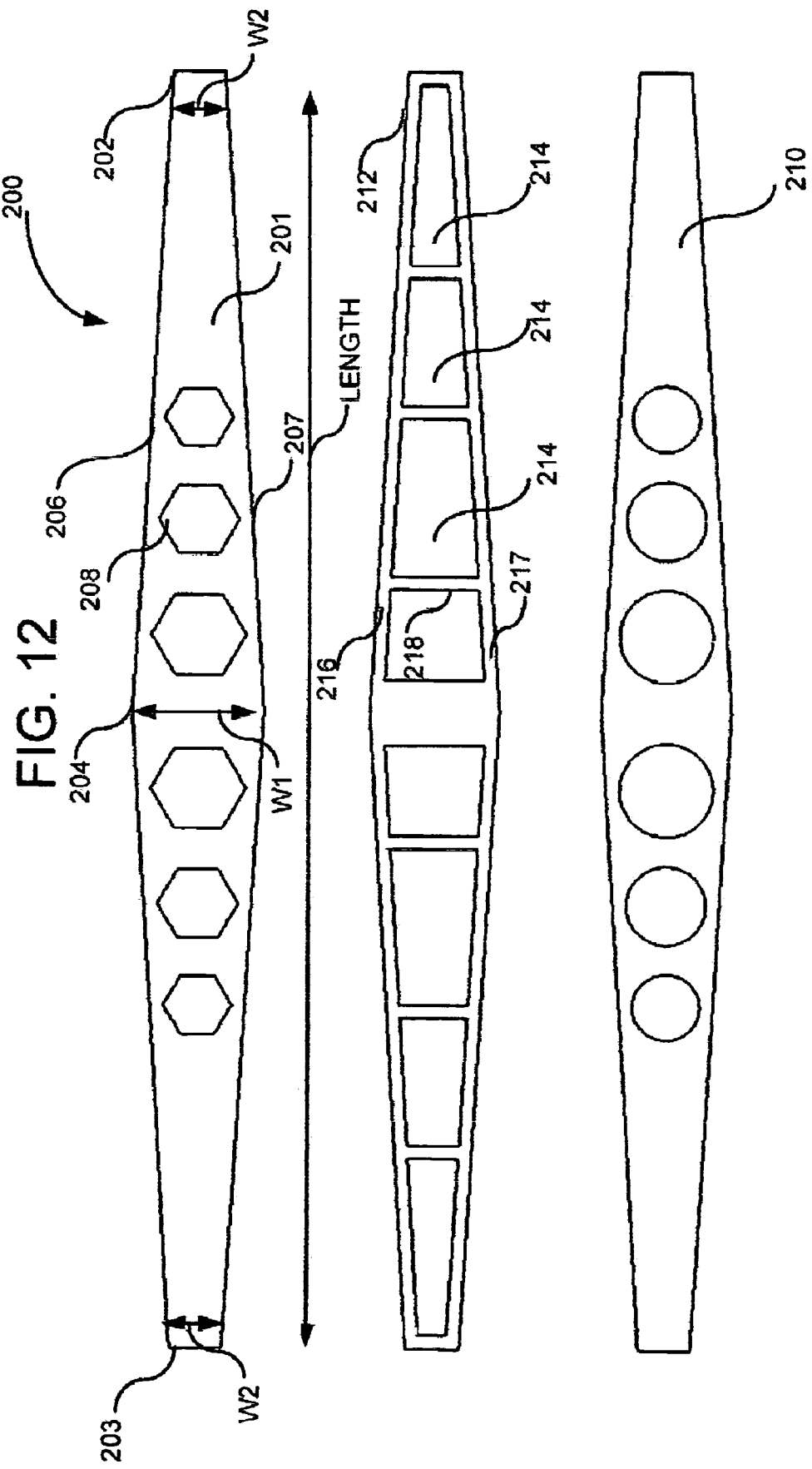

SPATIAL LIGHT MODULATOR WITH PERFORATED HINGE

CROSS REFERENCE TO RELATED APPLICATIONS

The present application claims priority to U.S. provisional patent application 60/702,139 filed Jul. 25, 2005, entitled "Spatial Light Modulator with Perforated Hinge" in the name of Jonathan David Mohn, which is hereby incorporated by reference.

FIELD OF THE INVENTION

The present invention generally relates to spatial light modulators and, more particularly, to the rotational aspects of a spatial light modulator.

BACKGROUND

A Spatial light modulator (SLM) is one of an array of optical elements (pixels) in which each pixel acts independently as an optical "valve" to adjust or modulate light intensity. The modulation of pixels is accomplished electronically based on image data, essentially converting image information from the electronic domain into light. An SLM does not create its own light, but rather modulates (either reflectively or transmissively) light from a lamp or laser source to create a dynamically reconfigurable digital image.

SLMs are used in many technical areas in order to control light on a pixel-by-pixel basis, such as optical data processing, adaptive optics, optical correlation, machine vision, image processing and analysis, beam steering, holographic data storage, displays and MEMS devices (e.g., digital micromirror device (DMD) or the grating light valve (GLV) device). The most typical applications of SLMs are for digital displays, consumer TVs, and office projectors.

The basic structure of an SLM includes a reflecting surface, a hinge member, and one or more electrodes. One electrode can be charged with a voltage while the reflecting surface is oppositely charged causing an electrostatic attraction between the underside of the reflecting surface and the electrode. This electrostatic attraction is enough to deform the hinge, upon which the reflecting surface sits, and to tilt the reflecting surface in the desired direction.

To return the reflecting surface to its original position, the electrode and the reflecting surface are driven to the same voltage level (e.g., ground) releasing the electrostatic attraction. The hinge member acts as a spring and returns to its natural, at-rest position, much like a bent tree limb springs back to its natural position.

A cross-sectional view of a SLM 100 is shown in FIG. 1. The SLM includes a base 102 and two opposing electrodes, shown generally at 106, 108. Opposing spring fingers 110, 112 are mounted above the electrodes and generally stop the rotation of a reflecting surface 114 as it rotates towards one of the electrodes 106, 108. The reflecting surface 114 rotates by means of a hinge, shown generally at 116. The hinge is a solid, elongated piece (not shown) having the ability to deform under force and return to its natural position once the force is removed. FIG. 1 shows a spatial light modulator in the activated or "ON" position. To activate the spatial light modulator, the electrode 106 is positively charged, while the underside of the reflecting surface 114 is negatively charged causing the reflecting surface to rotate about hinge 116 until the reflecting surface contacts spring finger 110. In this position, deflected light 122 has an angle of reflection desirable to project the light beam 118 from a light source 120 towards, for example, a pixel 124 on a display, FIG. 2 shows the same spatial light modulator 100 in a deactivated or "OFF" position. In this view, the reflecting surface 114 is rotated toward the opposing electrode 108 until the reflecting surface 114 contacts spring finger 112. In this position, the directional light 118 is deflected into a light absorber 126.

Current designs of the hinge member are not ideal for the proper operation of the SLM. For example, the SLM may required a high actuation voltage in order to deform the hinge. Likewise, the hinge member may have a slow spring-back time to return to its natural position hindering the speed of the SLM. The hinges are also vulnerable to hinge thickness variations during the manufacturing process that can cause non-uniform rotation. The thickness variations also affect the ability to further reduce the size of the hinge, which ultimately limits its speed.

Thus, it is desirable to increase the speed and efficiency of an SLM.

SUMMARY

The present invention increases speed and efficiency of an SLM through the use of a perforated hinge. The perforated hinge may take many forms, but generally includes an elongated body having one or more holes therein along its longitudinal direction.

The perforated hinge can be formed by using a number of different materials. Preferably, the perforated hinge may be made of material whose fatigue lifetime exceeds $1.0e^9$ hinge deflection cycles. For example, the hinge may be made from one or more of the following: copper, copper alloy, aluminum, aluminum alloy, single crystal silicon, amorphous silicon, polysilicon, silicon nitride, titanium, and titanium alloy.

The perforations within the hinge results in the hinge being made from less material than prior art hinges. Less material within the hinge means that it will be less sensitive to hinge thickness variations that can occur during the manufacturing process. Consequently, the perforated hinge allows for more stable, uniform mirror rotation. Additionally, because it is less sensitive to hinge thickness variations, the size of the hinge can be further reduced, which results in more chips per wafer and a lower cost per chip. This reduced size of the perforated hinge also allows for faster mirror flipping speeds, such as less than 800 nano-seconds.

These features and others of the described embodiments will be more readily apparent from the following detailed description, which proceeds with reference to the accompanying drawings.

FIG: 3 shows a perspective view of a portion of an SLM array; one SLM having its reflecting surface removed to expose a perforated hinge according to the invention.

FIGS. 4A-D show perspective views of an SLM design having a perforated hinge and a centrally mounted support post for a reflecting surface.

FIGS. 5A-D show perspective views of an SLM having a perforated hinge and a centrally mounted reflecting surface positioned upon a yoke.

FIGS. 6A-D show perspective views of an SLM having a perforated hinge and two opposing support posts positioned at opposite ends of the hinge.

FIG. 7 shows a side-profile view of an SLM with a single-level electrode.

Figure 8:
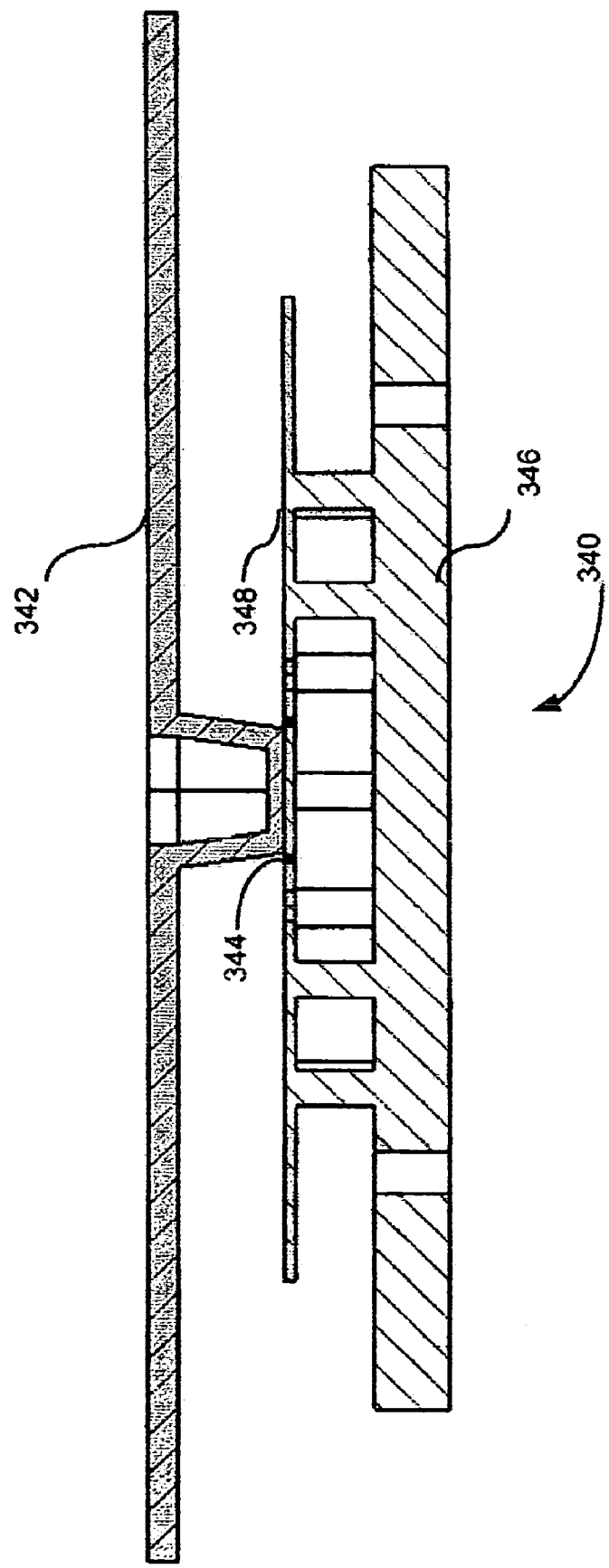

FIG. 8 shows a side-profile view of an SLM with a double-level electrode.

FIGS. 9A-9D show a top view of an SLM having a perforated hinge having a single spring finger for each electrode.

FIG. 10 shows a perspective view of a side-mounted perforated hinge design.

Figure 11:
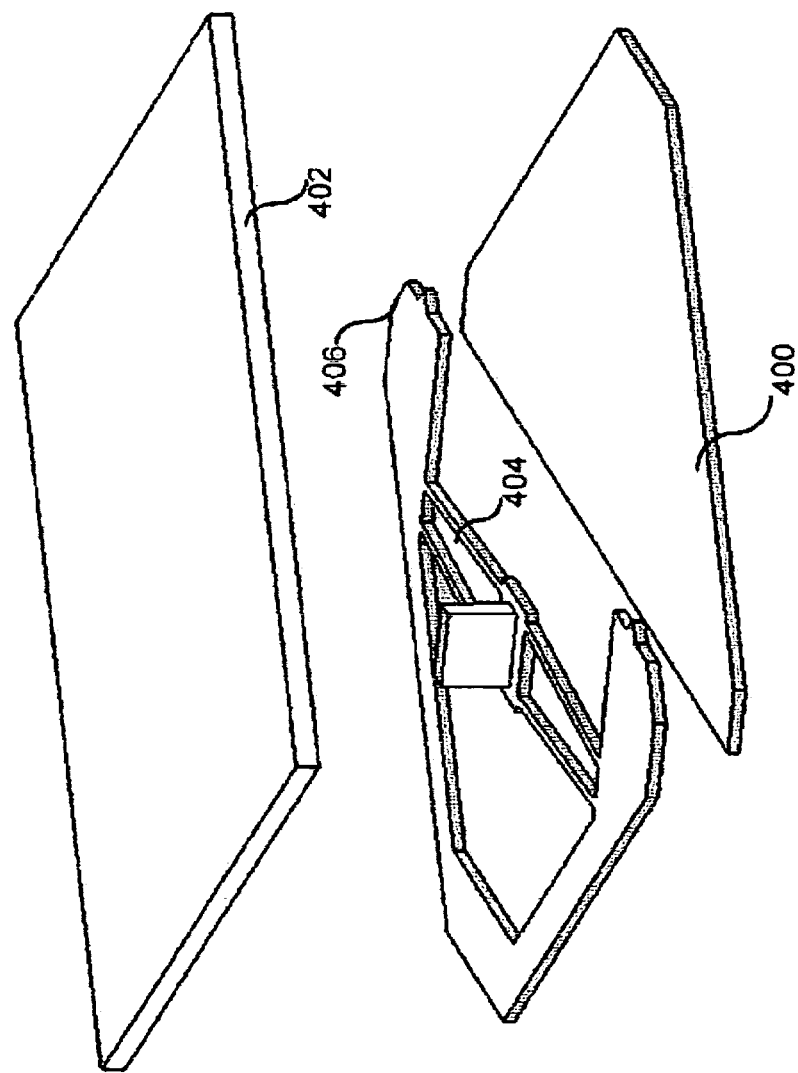

FIG. 11 shows a perspective view of a single-electrode design with a perforate hinge.

FIG. 12 shows a top view of other perforated hinge designs.

DETAILED DESCRIPTION

Figure 1:
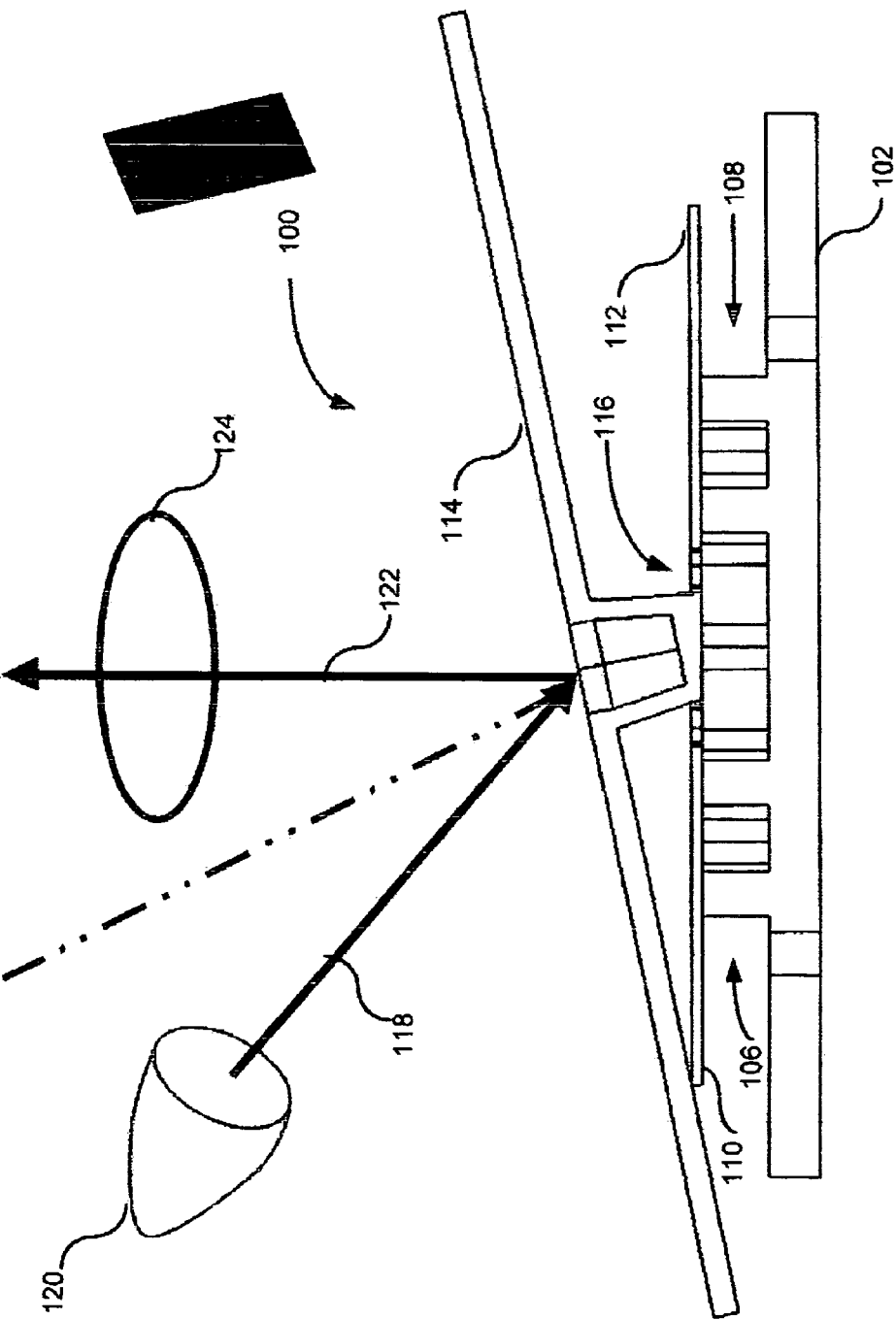
FIG. 1 shows a side-profile view of a prior-art SLM in an activated state.
Figure 2:
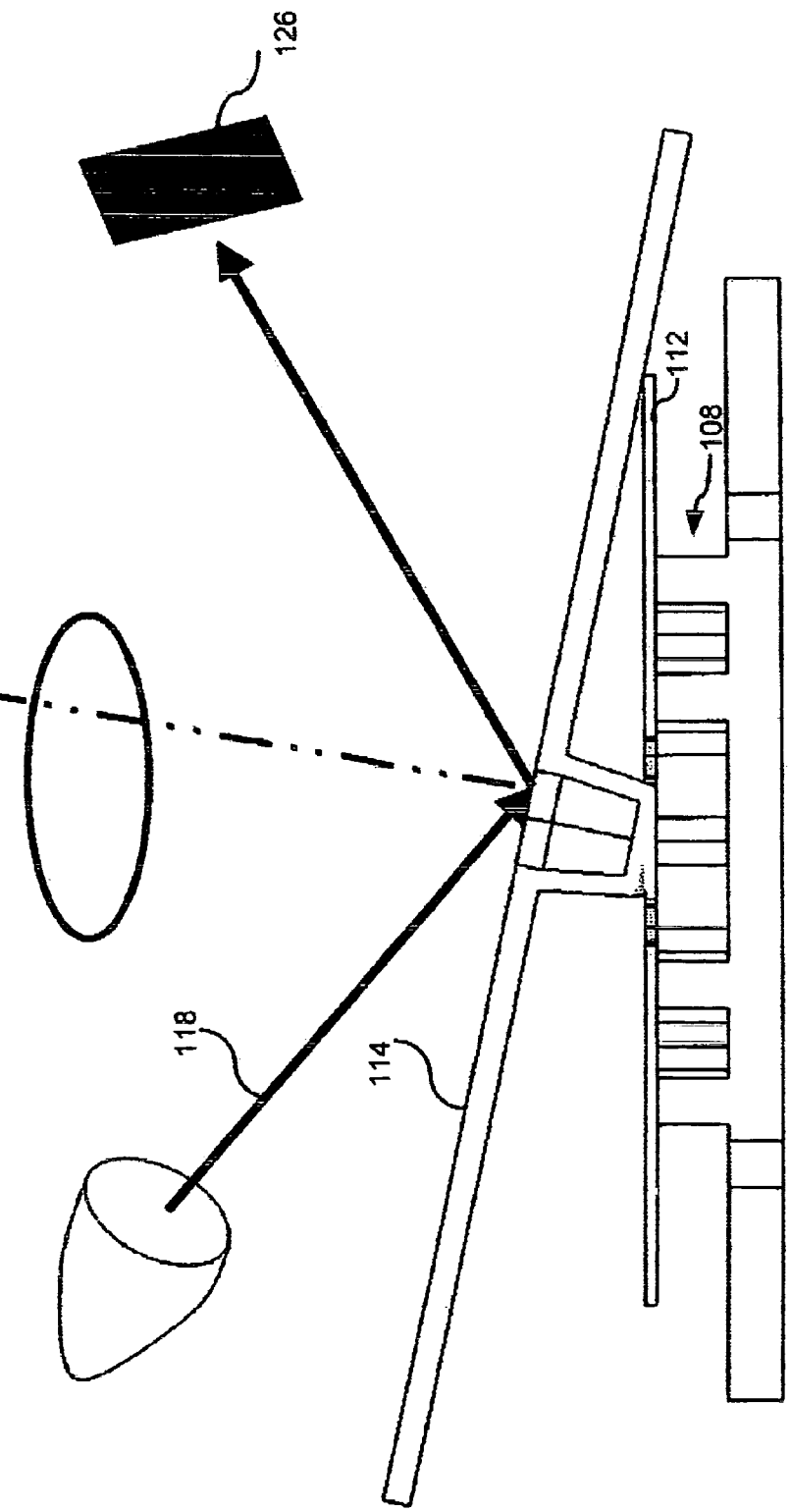
FIG. 2 shows a side-profile view of a prior-art SLM in a deactivated state.
Figure 3:
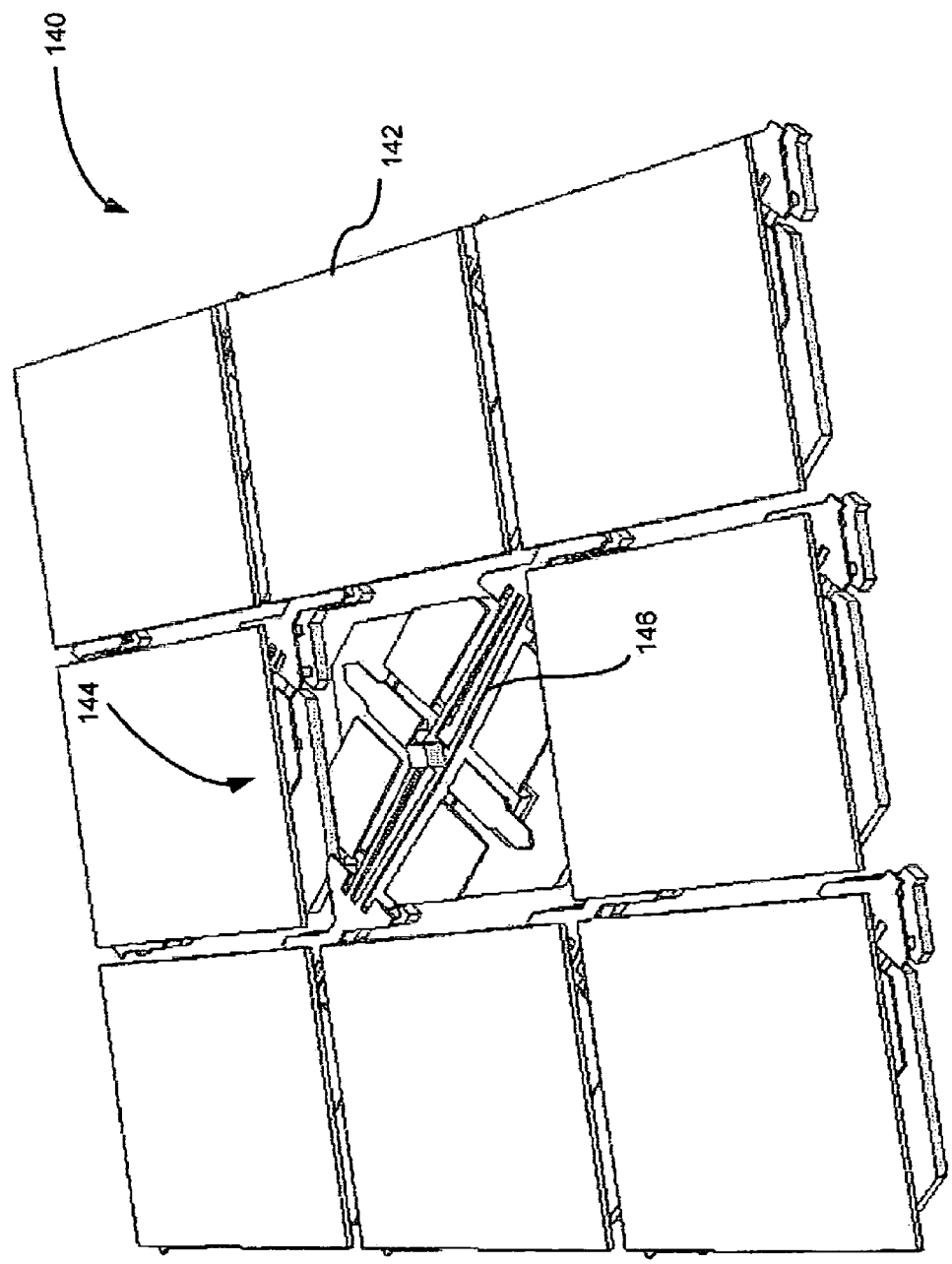

FIG. 3 shows a perspective view of an array 140 of SLMs with the tops of various reflecting surfaces 142 having a square shape. Although an array of only nine SLMS is shown, in practice the array can include any desired number of SLMs depending on the application. An example array is a 1920×1080 array of SLMs. Normally, the array is formed on a single silicon wafer to be used in a chip. One reflecting surface is removed to expose an SLM 144 according to the invention. A perforated hinge 146 is shown and described further below in relation to other figures. The hinge 146 is diagonally positioned along a direction connecting two opposing corners of the square-shaped reflecting surface. The perforated hinge 146 may take a variety of shapes and configurations. Additionally, the perforated hinge 146 can be used in any desired SLM design.

FIGS. 4A-4D show various examples of an SLM with a perforated hinge in more detail. The SLM 160 includes a base 162 that houses two sets of spring finger support posts 164, 165. Spring-fingers support plates 166, 167 are positioned on the posts 164, 165, respectively. Spring fingers 168, 169 are located on the ends of the support plates 166, 167 and are used to overcome stiction force (Vanderwaals electrostatic force) encountered during normal operation of the mirror (not shown). Electrodes 170, 172 are positioned between the spring fingers 168, 169 and are used to tilt the reflecting surface in a desired direction. The electrodes 170, 172 are driven by CMOS transistors (not shown) coupled to a source voltage to charge the electrodes in a well-known manner. Other methods of charging electrodes may also be used. An elongated perforated hinge 174 is coupled at its ends to opposing support plates 166, 167. Centrally located on the perforated hinge, midway between the support plates 166, 167, is a support post 176 for mounting of the reflecting surface. Instead of being a solid piece, the perforated hinge 174 includes non-uniformly sized holes 178 (also called perforations). Cross supports 180 may extend across the holes to further strengthen the hinge 174.

Turning briefly to FIG. 12, several examples of perforated hinges are shown and may be used with any of the SLMs described herein. Perforated hinge 200 is shown having an elongated body 201 with opposing ends 202, 203. The width of the body 201 is non-uniform, as it is wider at a center point 204 (W1) than at its ends 202, 203 (W2). The elongated body 201 has opposing side walls 206 and 207 that together with the ends 202, 203, form the perimeter of the body. Between the side walls 206, 207, there are a plurality of non-uniformly sized, hexagon-shaped holes 208. Although six hexagons are shown, any number of hexagons could be included in the design. Additionally, any geometric shape or combinations of geometric shapes can be used in place of the hexagons. For example, the perforated hinge shown at 210 uses circles for perforations instead of hexagons. The holes or perforations may also be uniformly sized. Perforated hinge 212 is another example wherein the holes take the form of a plurality of parallelograms 214 having non-uniform size. The combination of parallelograms form two longitudinal members 216, 217 that run parallel to the axis of rotation of the reflecting surface with cross members 218 extending there between for additional support. In general, it is desirable that the holes in the perforated hinge represent greater than five percent of the total surface area of the hinge (the total surface area being measured as if the hinge was a solid piece without holes). Alternatively, it is desirable that one or more of the holes are greater in width (or diameter) than ten percent of the width of the hinge at the location of the hole. In some cases, such as perforated hinge 212, the holes 214 represent more than eight-five percent of the total surface area of the hinge. Thus it can be seen that the shape and the form of the perforations within the hinge is not of importance and may vary depending on the application.

The material from which the hinge is made varies depending on the application. In one application, it is desirable that the material used has a fatigue lifetime that exceeds $1.0e^9$ hinge deflection cycles. Example materials include copper, copper alloy, aluminium, aluminium alloy, single crystal silicon, amorphous silicon, polysilicon, silicon nitride, titanium, and titanium alloy or combinations thereof. Other materials may also be used.

Returning to FIG. 4B, a perforated hinge 220 is shown having holes formed therein by two equally sized rectangles 222, 224. In this example, the perforated hinge 220 has uniform width. One difference between the embodiment of FIG. 4B and those of FIG. 12, shown at 200 and 210, is the ratio of hole space to the overall size of the perforated hinge 220 is much greater with the perforated hinge of FIG. 4B. Having a greater ratio of hole space in the perforated hinge allows the hinge stiffness to be less sensitive to hinge thickness. On the other hand, the greater the ratio, the weaker the hinge.

Figure 4A:
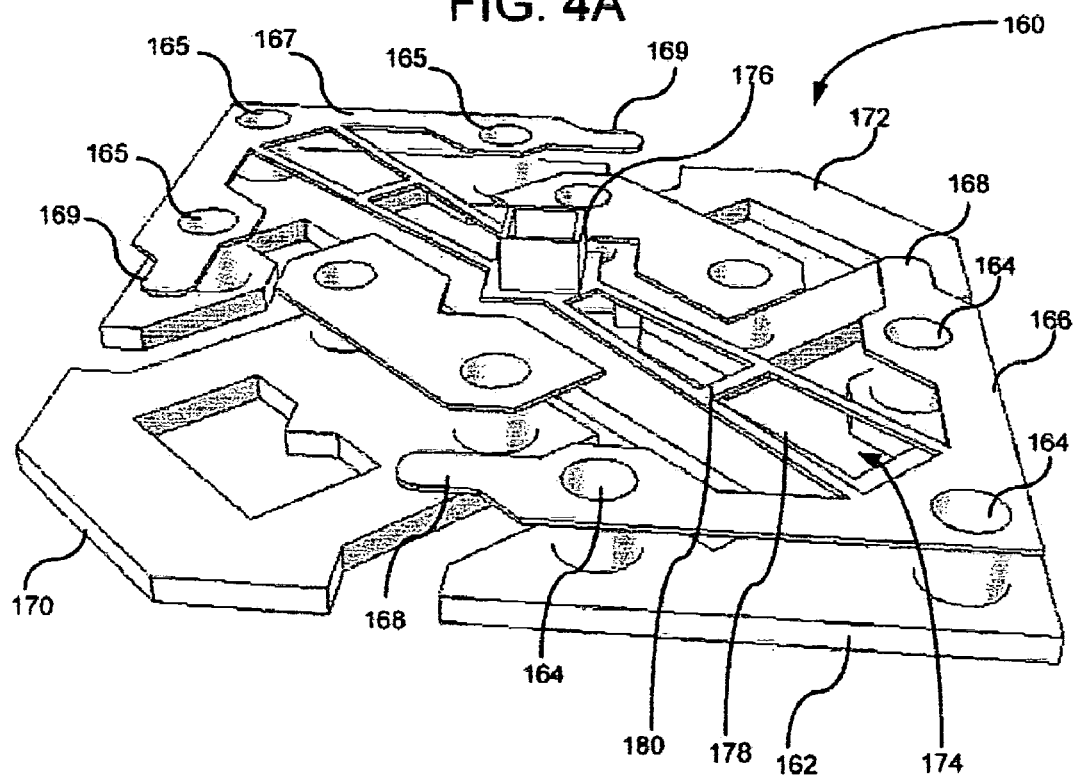
Figure 4B:
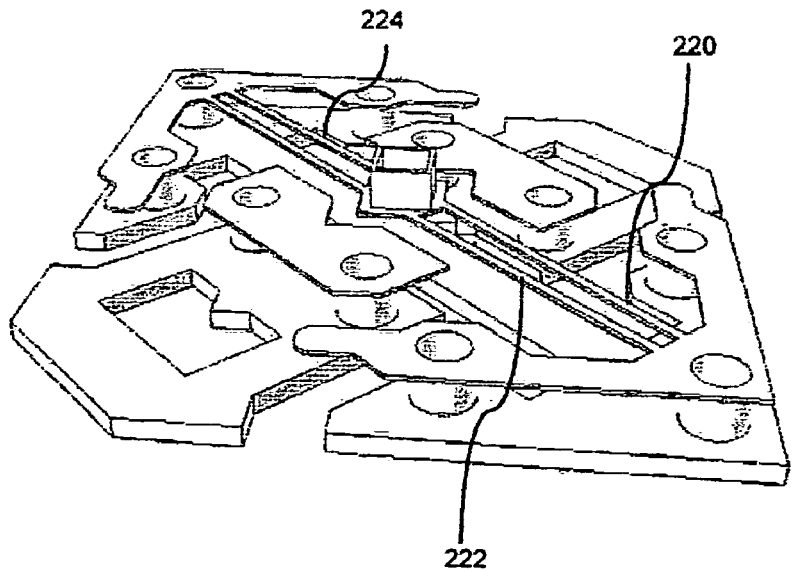
Figure 4C:
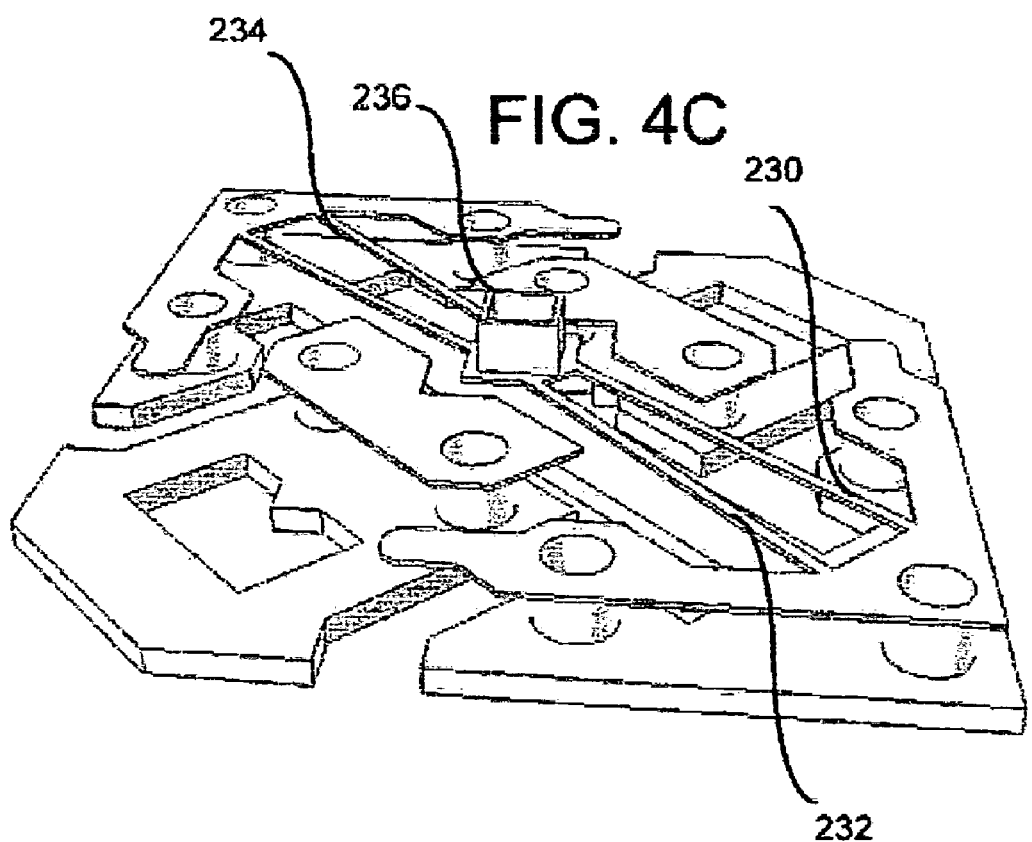
Figure 4D:
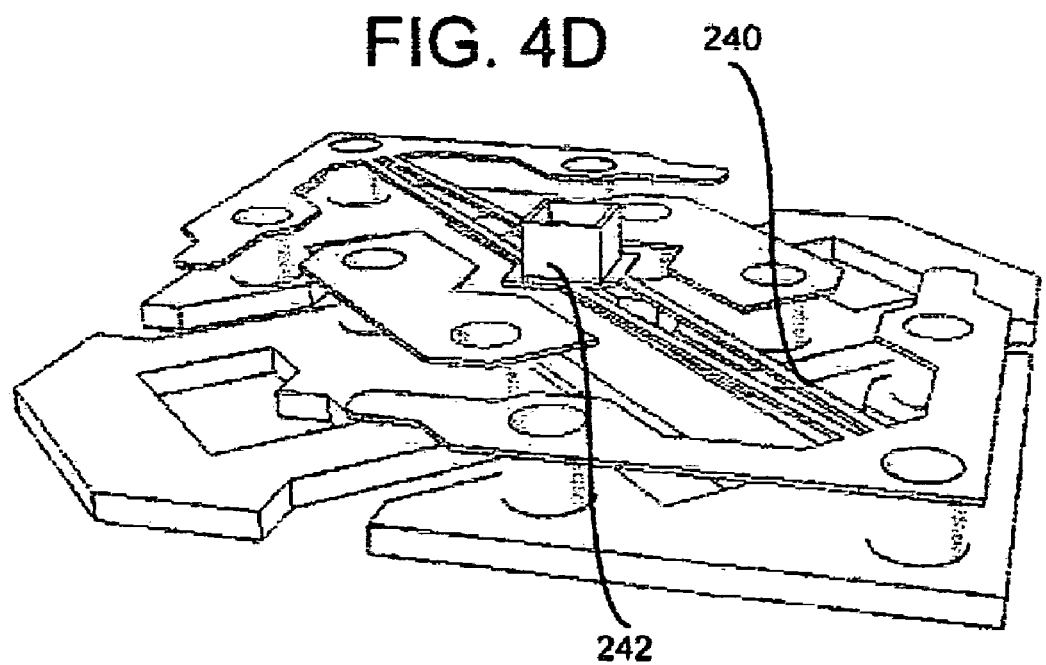

FIGS. 4C and 4D show perforated hinges 230 and 240, respectively. Hinge 230 has two parallelogram-shaped holes 232, 234 with opposing side walls converging as they approach a center support 236 for the reflecting surface. FIG. 4D has the hinge 240 with two parallelogram-shaped holes, but with opposing sides of the parallelograms diverging as they approach the center support 242.

FIGS. 5A-5D show the perforated hinge used in a different type of SLM. This type of SLM is disclosed in U.S. Pat. No. 6,819,470, which is hereby incorporated by reference. However, a perforated hinge, such as shown at 260, is incorporated into the design. In this embodiment, a yoke 262 is coupled between opposite portions 264, 266 of the perforated hinge 260. The portions 264, 266 each include a hole in the shape of a parallelogram.

Figure 5A:
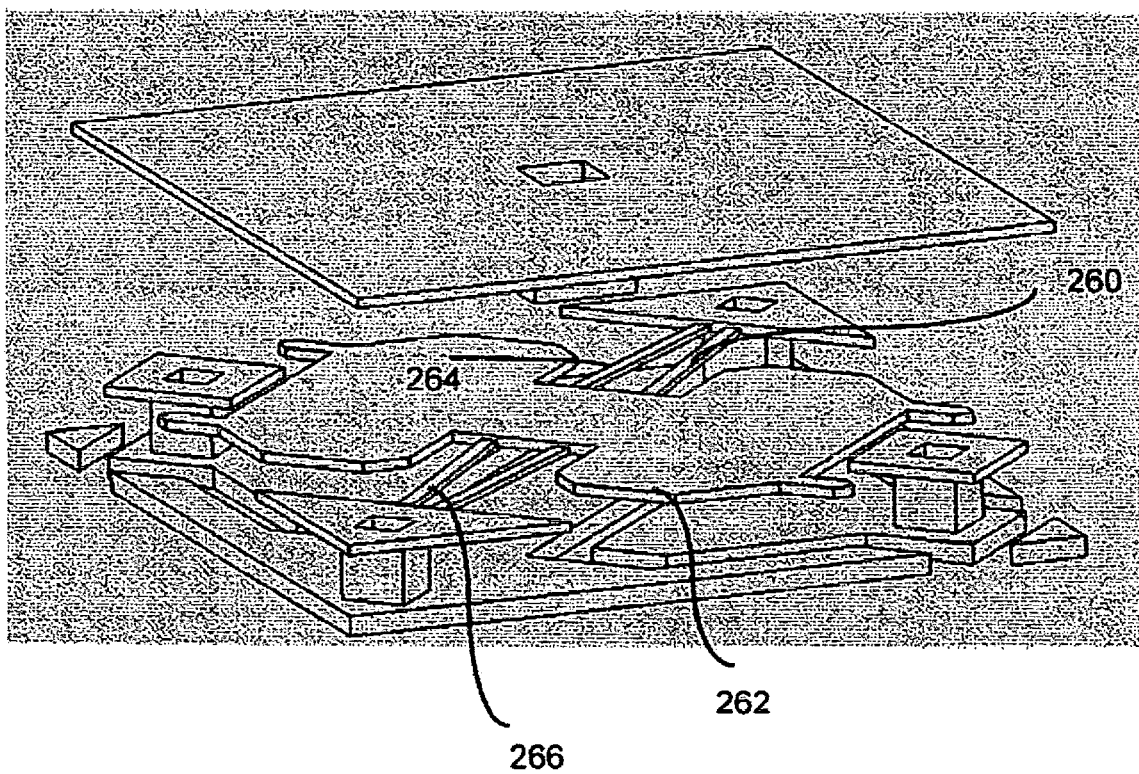
Figure 5B:
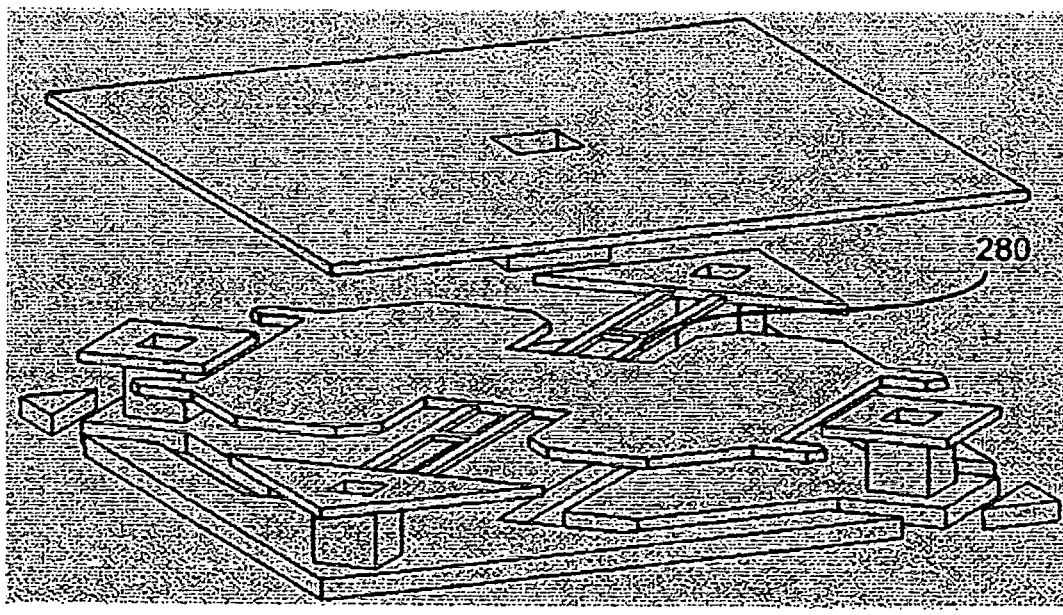
Figure 5C:
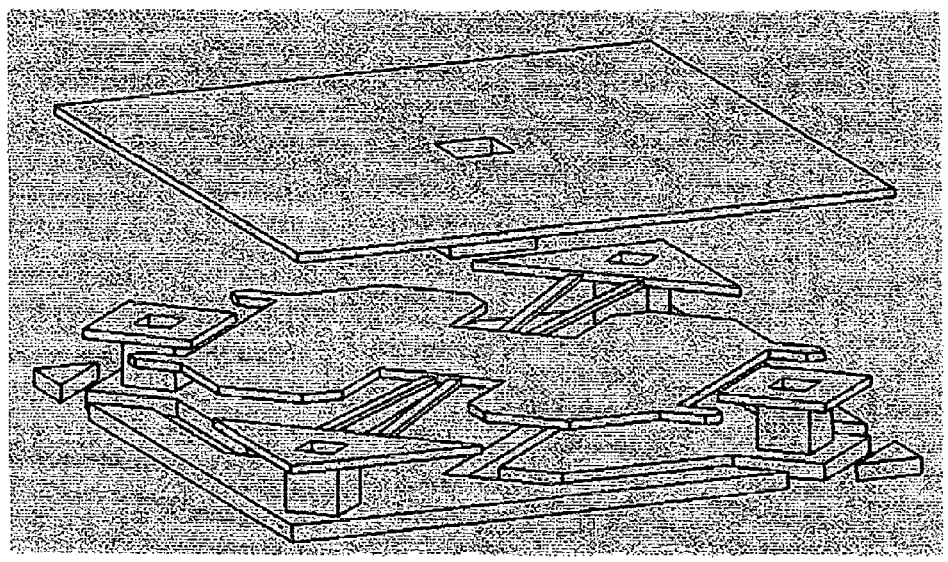
Figure 5D:
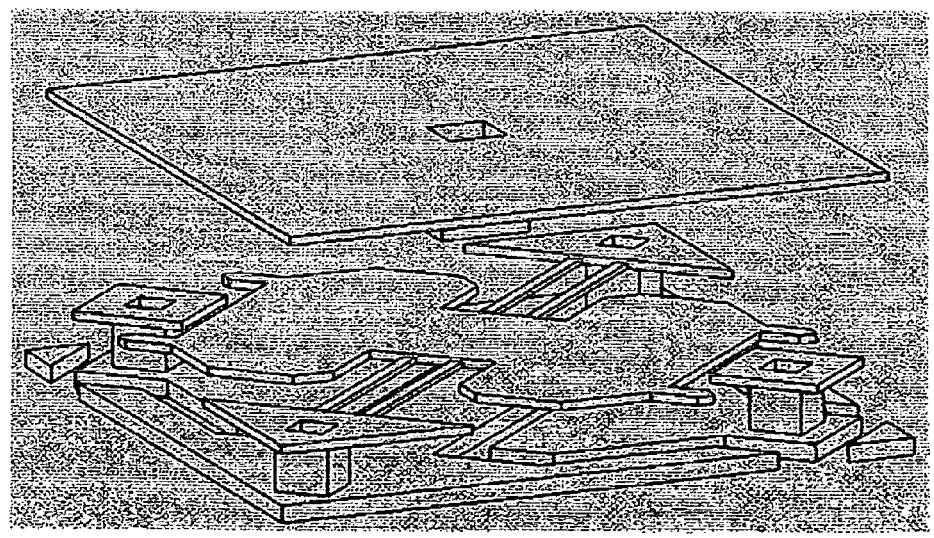

FIG. 5B shows a perforated hinge 280 including holes formed by multiple rectangles on each side of the yoke. FIGS. 5C and 5D show similar variations of forms that the perforated hinge may take.

Figure 6A:
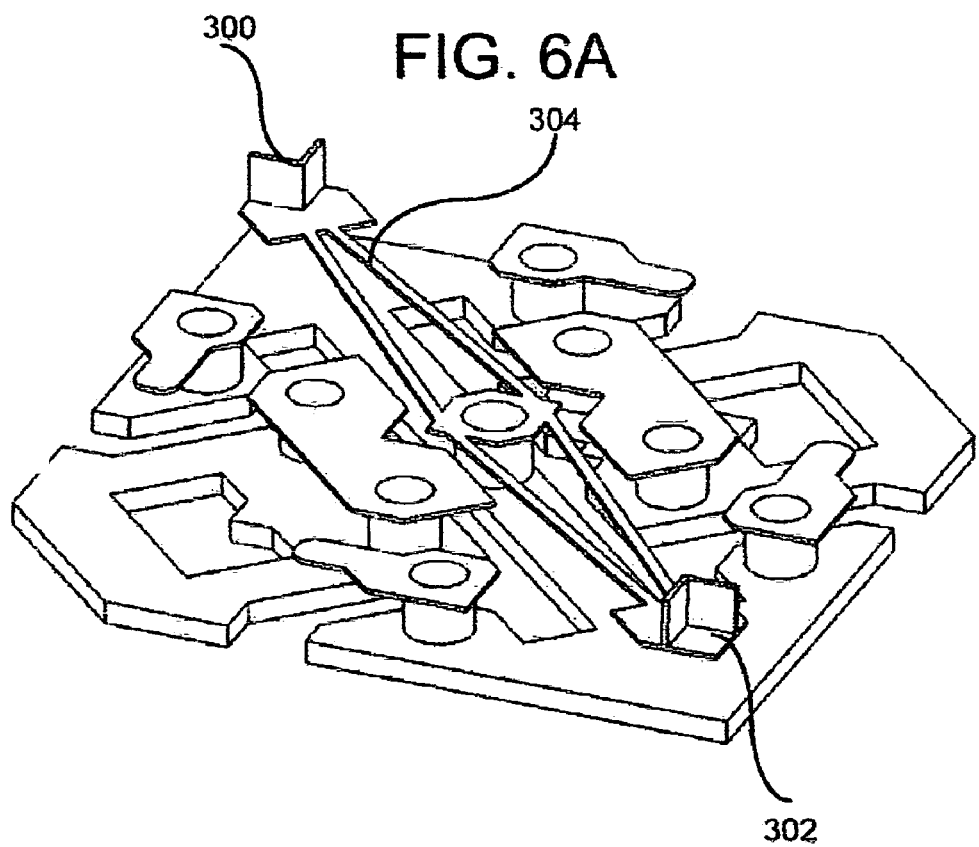
Figure 6B:
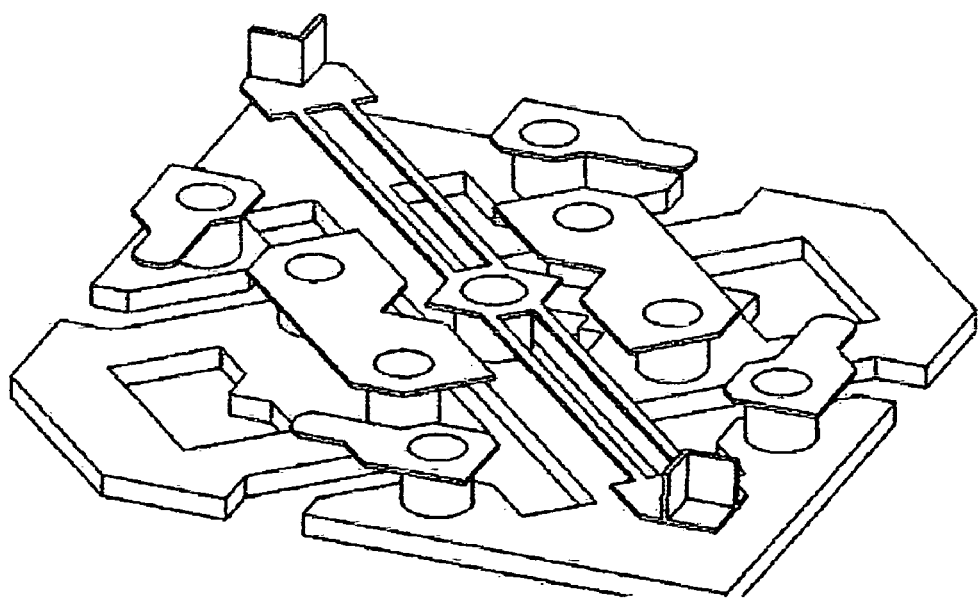
Figure 6C:
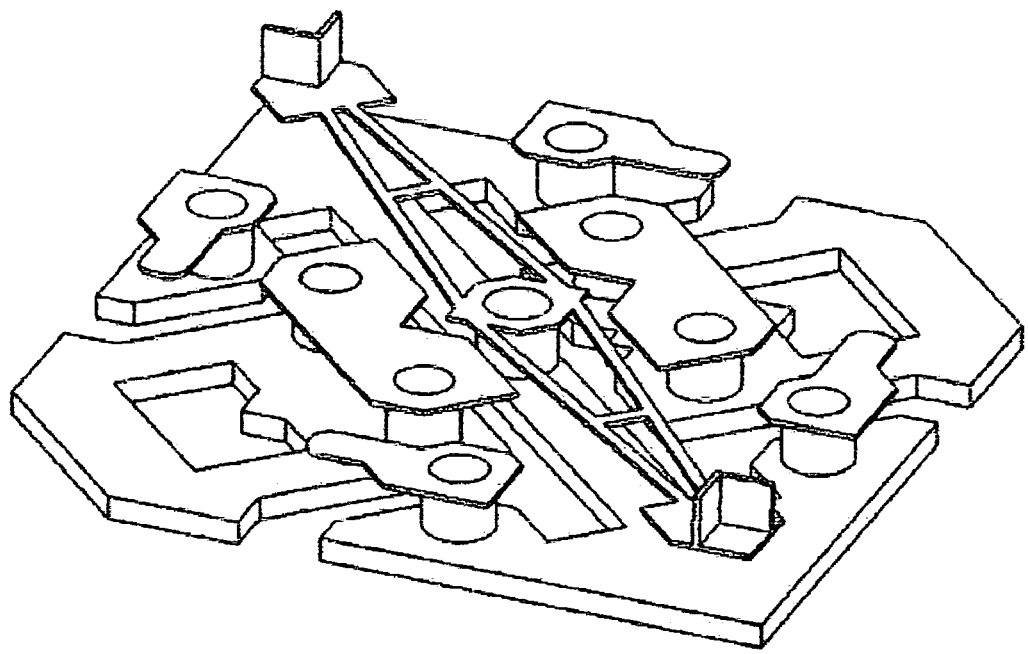
Figure 6D:
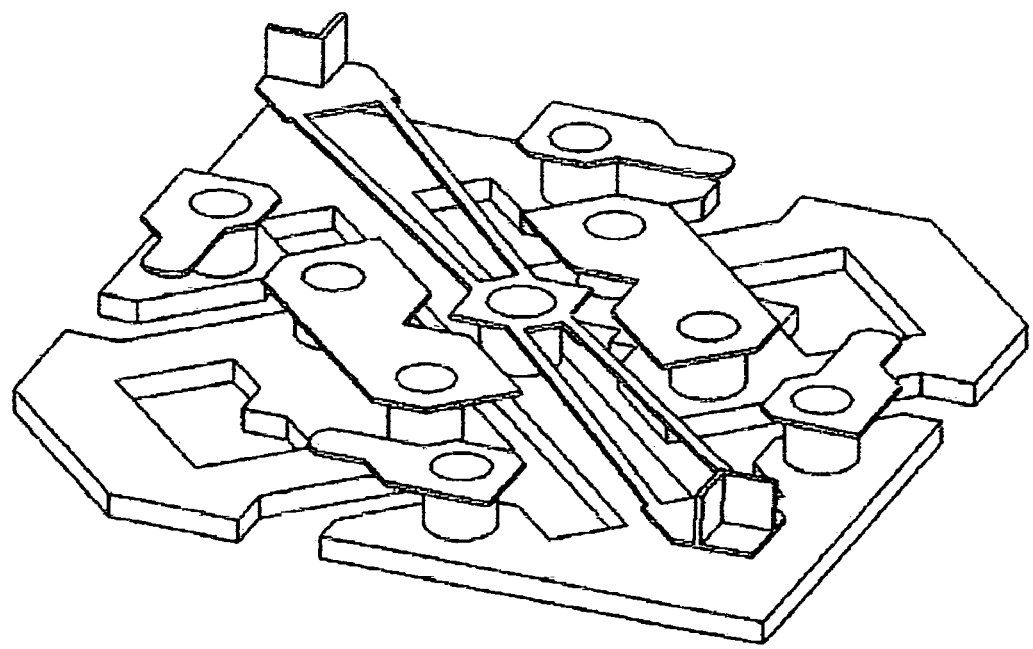

FIG. 6A shows yet another form of SLM where the reflecting surface (not shown) is mounted to several support posts 300, 302 located on opposite ends of the perforated hinge 304. FIGS. 6B-6D again show variations of the form the perforated hinge may take.

FIG. 7 shows other variations of SLMs wherein single-level electrodes 320 are used. The perforated hinge 322 can also be used to rotate a reflecting surface 324 in this type of SLM.

FIG. 8 shows an SLM where double-level electrodes 340 are used. A reflecting surface 342 rotates on a perforated hinge 344 based on the state of the double-level electrodes 340. The first level of the electrode 340 can be seen at 346 and the second level at 348. The double levels provide a greater electrostatic attraction between the reflecting surfaces and the electrodes.

Figure 9A:
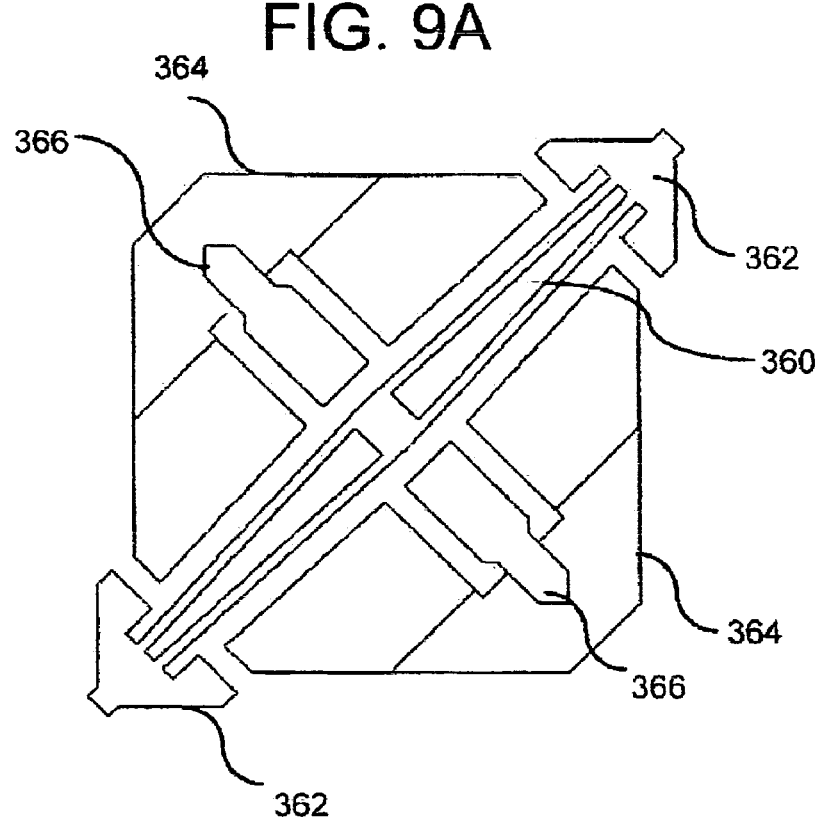
Figure 9B:
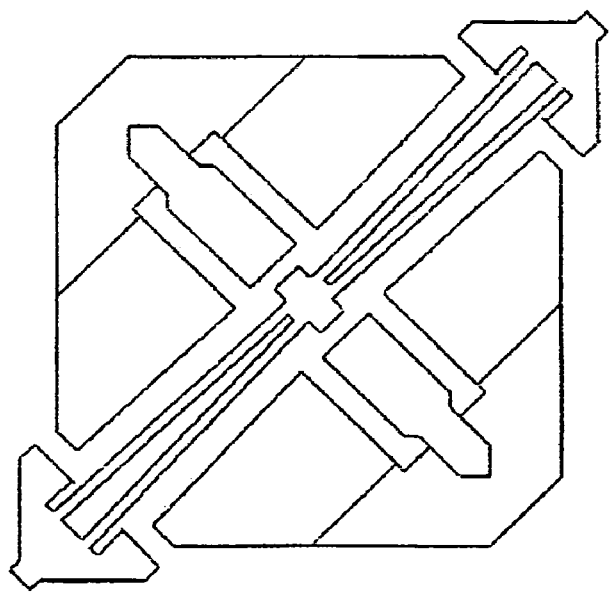
Figure 9C:
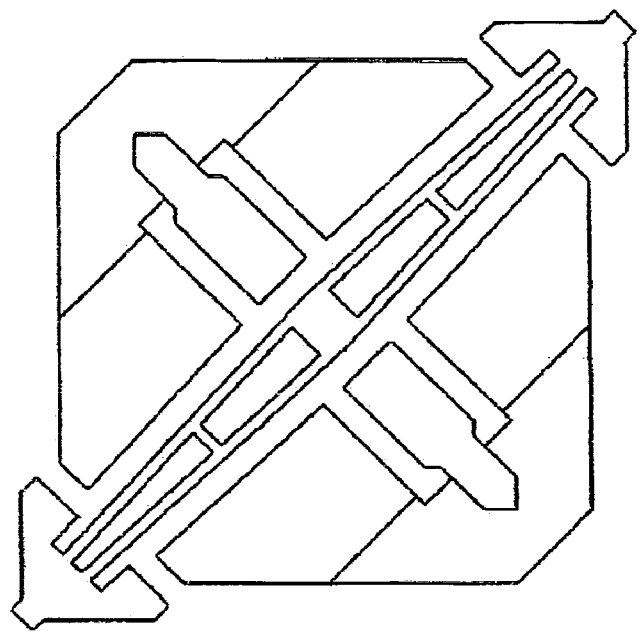
Figure 9D:
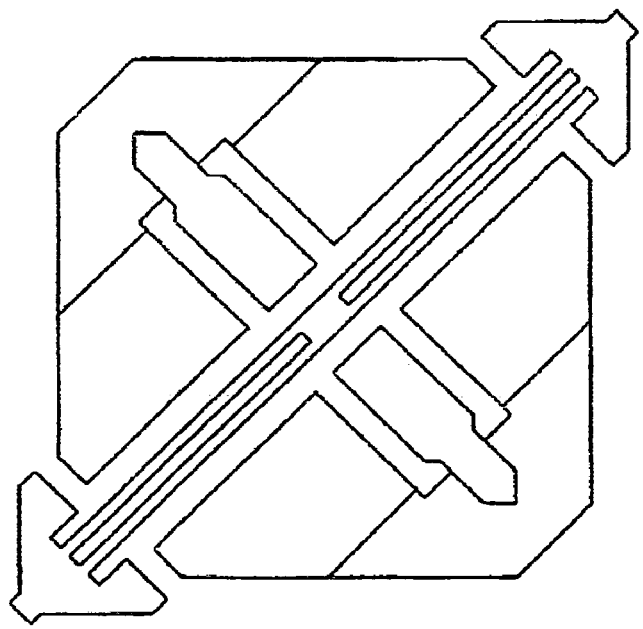

FIGS. 9A-9D show other possible types of an SLM with perforated hinges. Looking first at FIG. 9A, a perforated hinge 360 is coupled to opposing supports 362. Opposing electrodes 364 allow for rotation of a reflecting surface (not shown) towards either of the electrodes. Spring fingers 366 are used to stop the rotation of the reflecting surface. This embodiment differs in that only a single spring finger is used per side, rather than two. FIGS. 9B-9D show that other perforated hinge designs may also be used with a type of SLM having a single spring finger per side.

FIG. 10 shows another possible SLM design. In this case, an SLM is shown that is of the type described in U.S. Patent Publication 2004/0145795, which is hereby incorporated by reference. In this case, the SLM 380 has a side-mounted perforated hinge 382 to rotate a reflecting surface 384. All other variations of the perforated hinge may also be used.

FIG. 11 shows another design of an SLM of the type described in U.S. Pat. No. 6,867,897, which is hereby incorporated by reference. In this case, a single electrode 400 is used to rotate a reflecting surface 402. A perforated hinge 404 is mounted to a base 406 in order for the reflecting surface to rotate.

Thus, it can be seen that the perforated hinge may be used with a wide variety of SLM types, including single electrode, double electrode, single-level and double-level electrodes, single or double spring fingers, etc. Additionally, the perforated hinge may take a variety of forms.

Having illustrated and described the principles of the illustrated embodiments, it will be apparent to those skilled in the art that the embodiments can be modified in arrangement and detail without departing from such principles.

For example, some of the potential SLM designs are illustrated in the description and figures, but every possible SLM available cannot be described for simplicity and clarity of the application. Nonetheless, those skilled in the art may easily adapt the perforated hinge described herein into different SLM designs.

Additionally, although square reflecting surfaces are used, the reflecting surfaces can be any desired shape.

Further, the perforated hinge may be mounted to the reflecting surface in any desired manner, such as using one or more support posts or a side connected hinge.

Still further, although a two-level electrode is shown, additional levels may be added. For example, a three-level electrode may be used. With a multi-level electrode, each successive level is shorter than the previous level so as not to interfere with mirror rotation. Thus, FIG. 8 shows the second level electrode 348 is shorter than the first level electrode 346. Likewise, a third level positioned on top of the second level would again be shorter. Ideally, as the mirror rotates, the bottom surface of the mirror is equal distance from the distal ends of each electrode.

In view of the many possible embodiments, it will be recognized that the illustrated embodiments include only examples of the invention and should not be taken as a limitation on the scope of the invention. Rather, the invention is defined by the following claims. We therefore claim as the invention all such embodiments that come within the scope of these claims.

I claim:

1. A spatial light modulator, comprising:
   a reflecting surface;
   one or more electrodes; and
   a perforated hinge coupled to the reflecting surface to allow rotation of the reflecting surface towards the one or more electrodes wherein the perforated hinge includes an elongated body having holes therein.

2. The spatial light modulator of claim 1, wherein the holes are at least 10% of a width of the elongated body.

3. The spatial light modulator of claim 1, wherein the holes are a geometric shape including one or more of the following: parallelograms, hexagons, squares, circles, or rectangles.

4. The spatial light modulator of claim 1, further comprising:
   a spatial light modulator body having the one or more electrodes and opposing supports mounted thereto, the perforated hinge mounted to the opposing supports.

5. The spatial light modulator of claim 1, further including one or more spring fingers positioned between the reflecting surface and the electrodes to prevent contact there between.

6. The spatial light modulator of claim 1, wherein the one or more electrodes are single level or double level.

7. The spatial light modulator of claim 1, wherein the perforated hinge includes at least two, spaced-apart longitudinal members parallel to an axis of rotation of the reflecting surface.

8. The spatial light modulator of claim 7 including at least one cross member positioned between the longitudinal members.

9. The spatial light modulator of claim 1, wherein the perforated hinge includes at least three, spaced-apart, longitudinal members parallel to an axis of rotation of the reflecting surface.

10. The spatial light modulator of claim 1, wherein the perforated hinge includes two longitudinal sidewalls with two or more geometrical perforations positioned between the sidewalls.

11. The spatial light modulator of claim 1, wherein the perforated hinge includes two, equal-length longitudinal sidewalls forming a width there between of the perforated hinge, wherein the width of the hinge varies along its length.

12. The spatial light modulator of claim 1, wherein the perforated hinge is made of material whose fatigue lifetime exceeds $1.0e^9$ hinge deflection cycles.

13. The spatial light modulator of claim 12, wherein the material includes one of the following or a combination thereof: copper, copper alloy, aluminum, aluminum alloy, single crystal silicon, amorphous silicon, polysilicon, silicon nitride, titanium, and titanium alloy.

14. The spatial light modulator of claim 1, wherein the perforated hinge is mounted to the reflecting surface along an edge of the reflecting surface or below the reflecting surface.

15. The spatial light modulator of claim 1, wherein the reflecting surface is mounted to the perforated hinge using one or more support posts.

16. A spatial light modulator comprising:
    a perforated hinge including a body having a length (L) and a width (W), the body having two side walls defining the width with at least two holes positioned therein between the two side walls;

at least one support post coupled to the perforated hinge; and a reflecting surface mounted on the support post.

17. The spatial light modulator of claim 16 wherein the holes have a width greater than 10% the width of the body.

18. The spatial light modulator of claim 16, wherein the spatial light modulator is included in an array of spatial light modulators within a display.

19. The spatial light modulator of claim 16, further including one or more electrodes, wherein the perforated hinge torsionally rotates in response to a first voltage level on the one or more electrodes to rotate the reflecting surface towards the one or more electrodes.

20. The spatial light modulator of claim 19, wherein the perforated hinge rotates back to its at-rest position with a second voltage level on the one or more electrodes.

21. A spatial light modulator, comprising:
a reflecting surface;
one or more electrodes;
a perforated hinge coupled to the reflecting surface to allow rotation of the reflecting surface towards the one or more electrodes; and
a spatial light modulator body having the one or more electrodes and opposing supports mounted thereto, the perforated hinge mounted to the opposing supports.

22. The spatial light modulator of claim 21, wherein the perforated hinge torsionally rotates in response to voltage applied to the one or more electrodes and wherein the perforated hinge returns to its at-rest position in absence of voltage applied to the one or more electrodes.

23. A spatial light modulator, comprising:
a reflecting surface;
one or more electrodes;
a perforated hinge coupled to the reflecting surface to allow rotation of the reflecting surface towards the one or more electrodes; and
one or more spring fingers positioned between the reflecting surface and the electrodes to prevent contact there between.

24. A spatial light modulator, comprising:
a reflecting surface;
one or more electrodes; and
a perforated hinge coupled to the reflecting surface to allow rotation of the reflecting surface towards the one or more electrodes, wherein the perforated hinge includes at least two, spaced-apart longitudinal members parallel to an axis of rotation of the reflecting surface.

25. The spatial light modulator of claim 24, wherein the perforated hinge includes at least three, spaced-apart, longitudinal members parallel to an axis of rotation of the reflecting surface.

26. A spatial light modulator, comprising:
a reflecting surface;
one or more electrodes; and
a perforated hinge coupled to the reflecting surface to allow rotation of the reflecting surface towards the one or more electrodes, wherein the perforated hinge includes two longitudinal sidewalls with two or more geometrical perforations positioned between the sidewalls.

27. A spatial light modulator, comprising:
a reflecting surface;
one or more electrodes; and
a perforated hinge coupled to the reflecting surface to allow rotation of the reflecting surface towards the one or more electrodes, wherein the perforated hinge includes two, equal-length longitudinal sidewalls forming a width there between of the perforated hinge, wherein the width of the hinge varies along its length.

28. A spatial light modulator, comprising:
a reflecting surface;
one or more electrodes; and
a perforated hinge coupled to the reflecting surface to allow rotation of the reflecting surface towards the one or more electrodes, wherein the perforated hinge is made of material whose fatigue lifetime exceeds $1.0e^9$ hinge deflection cycles and wherein the perforated hinge twists in response to voltage applied to the one or more electrodes.

29. A spatial light modulator, comprising:
a reflecting surface;
one or more electrodes; and
a perforated hinge coupled to the reflecting surface to allow rotation of the reflecting surface towards the one or more electrodes, wherein the perforated hinge is mounted to the reflecting surface along an edge of the reflecting surface or below the reflecting surface and wherein the perforated hinge twists in response to voltage applied to the one or more electrodes.

* * * * *